US005591378A

United States Patent [19]

Deline et al.

[11] Patent Number: 5,591,378

[45] Date of Patent: Jan. 7, 1997

[54] SUBSTITUTED BENZONITRILES AND COMPOSITIONS USEFUL FOR BLEACHING

[75] Inventors: James E. Deline, Livermore; James W. Arbogast; Lafayette D. Foland, both of Dublin; William L. Smith, Pleasanton, all of Calif.

[73] Assignee: The Clorox Company, Oakland, Calif.

[21] Appl. No.: 271,093

[22] Filed: Jul. 6, 1994

[51] Int. Cl.$^6$ .......................... C09K 3/00; C11D 3/395; C11D 7/38

[52] U.S. Cl. .......................... 252/186.38; 252/186.39; 252/95; 510/312

[58] Field of Search .......................... 252/186.38, 186.39

[56] References Cited

U.S. PATENT DOCUMENTS

| | | | |
|---|---|---|---|
| 2,927,840 | 3/1960 | Dithmar | 8/111 |
| 3,114,603 | 12/1963 | Howell | 23/113 |
| 3,213,030 | 10/1965 | Diehl | 252/152 |
| 3,393,153 | 7/1968 | Zimmerer et al. | 252/95 |
| 3,400,021 | 9/1968 | Heinzelman | 148/6.1 |
| 3,400,176 | 9/1968 | Quimby . | |
| 3,422,137 | 1/1969 | Quimby . | |
| 3,950,277 | 4/1976 | Steward et al. | 252/541 |
| 3,983,002 | 9/1976 | Ohya et al. . | |
| 4,025,453 | 5/1977 | Kravetz et al. | 252/102 |
| 4,179,390 | 12/1979 | Spadini et al. | 252/95 |
| 4,294,575 | 10/1981 | Kowalski | 8/111 |
| 4,332,820 | 6/1982 | Markley | 424/304 |
| 4,435,307 | 3/1984 | Barbesgaard et al. | 252/174.12 |
| 4,443,355 | 4/1984 | Murata et al. | 252/174.12 |
| 4,479,881 | 10/1984 | Tai | 252/174.12 |
| 4,585,150 | 4/1986 | Beacham et al. | 222/129 |
| 4,756,845 | 7/1988 | Sugawara et al. | 252/102 |
| 5,360,569 | 11/1994 | Madison et al. | 252/102 |

FOREIGN PATENT DOCUMENTS 0458396 5/1991 European Pat. Off. .

OTHER PUBLICATIONS

Payne, "A Simplified Procedure for Epoxidation by Benzonitril–Hydrogen Peroxide . . . ", *Tetrahedron*, 18, pp. 763–765 (1962).

Sawaki et al., "Mechanism of the Reaction of Nitriles with Alkaline Hydrogen Peroxide . . . " *Bull. Chem. Soc. Jpn.*, 54, pp. 793–799 (1981).

*Primary Examiner*—Richard D. Lovering
*Assistant Examiner*—Joseph D. Anthony
*Attorney, Agent, or Firm*—Majestic, Parsons, Siebert & Hsue

[57] ABSTRACT

Substituted benzonitrile activators give excellent bleaching performance when combined with a peroxygen source and dissolved in solution. These substituted benzonitrile activators give best bleaching performance when the activators are multiply substituted with electron-withdrawing groups.

19 Claims, No Drawings

SUBSTITUTED BENZONITRILES AND COMPOSITIONS USEFUL FOR BLEACHING

FIELD OF THE INVENTION

The present invention relates to compounds which react with a peroxygen source in situ to form oxidant species, and particularly to substituted benzonitriles that can react with a peroxygen source to yield an effective bleaching agent.

BACKGROUND OF THE INVENTION

Cyanamides and nitriles can react with alkaline hydrogen peroxide to form a peroxyimidic intermediate, which is a powerful oxidant. Thus, for example, Payne, *Tetrahedron,* 18, pp. 763–765 (1962) describes the reaction of benzonitrile and hydrogen peroxide to give an extremely reactive intermediate termed peroxybenzimidic acid. This intermediate is too reactive to be isolated, and actually will oxidize hydrogen peroxide itself to oxygen. Sawaki, *Bull. Chem. Soc. Jpn.,* 54, pp. 793–799 (1981) summarized the reaction described by Payne, supra and also studied the effect of certain substituted benzonitriles (p-MeOPhCN, p-MePhCN, m-MePhCN, o-MePhCN, p-ClPhCN, and p-$O_2$NPhCN.

U.S. Pat. No. 4,756,845, issued Jul. 12, 1988, inventors Sugawara et al., discloses peroxide activators such as alkyl or alkoxy substituted dicyanobenzenes.

European patent application 91201170.7, published Nov. 27, 1991, inventor Oakes discloses peroxyacid bleach precursors such as can be prepared from an aromatic aldehyde or ketone by reaction with sodium cyanide and a dialkyl amine.

However, problems with the previously known cyanamide and nitriles have included limited stability, poor bleaching effectiveness, or a small amount of active oxidizing intermediate being formed.

SUMMARY OF THE INVENTION

It is an object of the present invention to provide activator compounds useful for bleaching applications.

In one aspect of the present invention a composition, useful for bleaching, comprises a substituted benzonitrile as an activator compound. The composition further includes a peroxygen source in a sufficient amount to form an oxidizing agent derivative of the activator compound when the peroxygen source and the activator compound are admixed in a solvent therefore. The solvent will typically be aqueous based, such as in laundry (washing machine) applications. The oxidizing agent derivative is thought to be a peroxyimidic acid. The peroxygen source preferably is in an amount that provides peroxygen in a molar ratio with respect to activator compound of about 1:1 or greater.

The composition preferably includes a pH adjusting agent and/or a metal sequestering agent. The pH adjusting agent, when present, is effective to adjust or to maintain the pH of a solution in which the oxidizing agent is intended to be dissolved, preferably an aqueous based solution, to a pH greater than about 8. The metal sequestering agent, when present, preferably includes a phosphonate, amino phosphates, or a mixture thereof.

Embodiments of the invention are benzonitriles with one or a plurality of cyano groups. When an embodiment has one cyano group, then there are also two other electron withdrawing groups unless the embodiment has a quaternary ammonium substituent such as

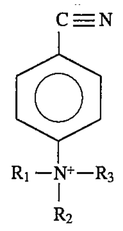

(where $R_1$, $R_2$ and $R_3$ are $C_{1-20}$ alkyl, and more preferably $C_{1-4}$ alkyl). In the instance of a quaternary ammonium substituent, then that substituent itself is a sufficient electron-withdrawing group so it may be the sole substituent (in addition to the cyano group). When there are a plurality of cyano groups, then the embodiment has at least one additional electron-withdrawing group.

A particularly preferred embodiment of the invention is 3,5-dinitrobenzonitrile, which gives excellent bleaching performance on oxidant sensitive stains. For all embodiments, the electron-withdrawing groups are believed to activate the nitrile portion of the molecule to react with peroxygen and to form an oxidizing agent derivative in aqueous solutions such as in laundry applications.

When practicing the invention in bleaching compositions, then bleaching power comparable to sodium hypochlorite on some stains with some embodiments of the inventive activators can be achieved.

DETAILED DESCRIPTION OF THE PREFERRED EMBODIMENTS

Compositions of the invention are contemplated for bleaching applications, particularly where aqueous based bleaching solutions are used to bleach stains on fabrics during laundering.

Particularly preferred compositions of the invention are in granular form, although liquid forms are possible so long as the activator and the peroxygen source are kept from reacting until desired. If liquid hydrogen peroxide is the peroxygen material, it may be necessary to keep it separated from the activator prior to addition to the wash liquid, so as to avoid premature decomposition and generation of active oxygen. An example of a practical execution of a liquid delivery system is to dispense separately metered amounts of the precursor (in some nonreactive fluid medium) and liquid hydrogen peroxide in a container such as described in Beacham et al, U.S. Pat. No. 4,585,150, commonly assigned to The Clorox Company, and incorporated herein by reference.

Activator compounds of the invention are substituted benzonitriles and thus have as an essential moiety

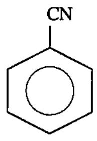

, which has one or more additional (electron-withdrawing group) substituents on the aromatic ring. More than two electron-withdrawing group substituents are contemplated, for example, such as where the substituents are up to five halo groups. Alternatively, the electron-withdrawing group substituents can together form an unsaturated ring, which is fused to the benzonitrile.

When one cyano group is present the benzonitrile has two or more electron-withdrawing groups except when the electron withdrawing group is a quaternary ammonium group. When a quaternary ammonium group is substituted on the ring, then it can be (but need not be) the sole electron-withdrawing group in addition to the one cyano group. A few illustrative examples of one cyano group with two or more electron-withdrawing groups are 3,5-dinitrobenzonitrile, 2,6-dinitrobenzonitrile, and 4-chloro-3-nitrobenzonitrile (which illustrates that the two or more electron-withdrawing groups need not be the same).

When more than one cyano group is present, then the benzonitrile has at least one more electron-withdrawing group. An illustrative example is tetrafluoroterephthalonitrile.

The electron-withdrawing group substituents can be selected to enhance water solubility of the activator, but a primary function for the substituents is believed to be that of activating the nitrile portion of the molecule towards reaction with hydrogen peroxide by an electron-withdrawing effect on the aromatic ring.

One embodiment of the inventive activators already mentioned has the structure

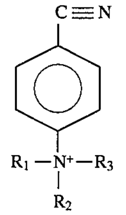

wherein $R_1$, $R_2$ and $R_3$ are $C_{1-20}$ alkyl, $C_{1-20}$ alkylaryl, or at least two of $R_1$, $R_2$ and $R_3$ join to form a heterocycle. Counterions for such a quaternary ammonium activator may include virtually any anionic counterion, such as, for example, halide, tosylate, carboxylate, alkyl or aryl sulphates, and the like. An additional advantage of the quaternary ammonium group of inventive activators is that alkyl chains may assist in substantive stain removal due to surface active properties.

Where $R_1$, $R_2$ and $R_3$ are lower alkyls, and particularly in the case of methyl and ethyl, these activator embodiments are readily prepared from commercially obtaining starting materials. Where each of $R_1$, $R_2$ and $R_3$ is methyl, then the 4-trimethylaminobenzonitrile (methyl sulfate salt), will sometimes hereafter be referred to as the "TMA-BN embodiment." This is a solid that is readily soluble in water and whose desired performance in bleaching compositions is not impeded by anionic species contained in typical laundry detergents.

The inventive TMA-BN embodiment may be prepared from commercially available 4-dimethylamino-benzonitrile by refluxing with 2 equivalents of dimethylsulfate in ethylacetate. During reflux, the product will slowly precipitate out of solution, and the reaction takes about 3 days at reflux to completion. The product may be filtered and washed with ethylacetate to remove starting materials. The resulting tan salt may be recrystallized from ethyl alcohol to yield a light tan solid.

Where $R_1$, $R_2$ and $R_3$, however, are selected from other than $C_{1-20}$ alkyl, other appropriate quaternary ammonium groups can be introduced onto a benzonitrile starting material. For example, a wide range of substituted quaternary ammonium compounds are available from Akzo Chemie America (Product Bulletins 81-6 and 84-14) and Sherex Chemicals "Specialty Quats," all of which are incorporated herein by reference thereto.

The TMA-BN embodiment can be simply admixed as is, if desired, into a detergent or laundry additive so that, in combination with a peroxygen source, bleaching is provided in situ of textile stain. The TMA-BN embodiment is a superior bleach activator with respect to cyanamide, and is actually comparable in bleaching power to sodium hypochlorite on some stains, as is illustrated by Tables 1 and 2 below.

TABLE 1

| | STAINS (% SRE) | | |
|---|---|---|---|
| Control | Grass | Ink* | Clay** |
| 1.25 g/L Tide detergent, 5 ppm aminopolyphosphonate, $H_2O_2$ (42 ppm as A.O.) | 87.1 | 64.8 | 95.5 |
| Control and Cyanamide (25 ppm A.O. theo.) | 83.7 | 83.3 | 97.9 |
| Control and TMA-BN (25 ppm A.O.) | 91.0 | 84.9 | 97.7 |

*Fountain pen ink.
**Bandy-black

TABLE 2

| | STAINS | | |
|---|---|---|---|
| Control | Clay# | Coffee | Ink## |
| $H_2O_2$ (106 ppm) | 93.1 | 65.1 | 67.4 |
| NaOCl 100 ppm ($53$ ppm $H_2O_2$) | 96.7 | 74.0 | 87.2 |
| TMA-BN, 15 ppm (53 ppm $H_2O_2$) | 95.1 | 73.5 | 90.5 |

#Bandy-black
Fountain pen ink

All treatments for which the data is summarized in Table 2 included detergent (1.25 g/L Tide), a metal sequestering agent (50 ppm aminopolyphosphonate), and a buffer solution (725 mg/L sodium carbonate). Stain removal was determined by making pre-wash and post-wash reflectant measurements on a Hunter Colorimeter and by washing in a Tergotometer for 12 minutes (in 1 L at 95° F.).

Under non-aqueous conditions, benzonitrile has been reported in the literature as a method of preparing epoxides from olefins and hydrogen peroxide; however, under laundry testing conditions, benzonitrile gives poor stain removal. By contrast, and as illustrated by the data in Tables 1 and 2, by adding a quaternary nitrogen group to the benzonitrile ring in accordance with one aspect of the invention, good bleaching action under aqueous laundering conditions is achieved.

As already noted, benzonitrile activators of the invention have one or a plurality of cyano groups and when there is one cyano group, then there will also be two or more electron-withdrawing group substituents (except in the case of the quaternary nitrogen group substituent already discussed). Up to five substituents, particularly in the case of halo, are feasible in the aromatic ring.

By "electron-withdrawing groups" for the substituents of the substituted benzonitrile is meant that, relative to hydrogen, the group is more electronegative and thus maintains a greater attraction for electrons across the sigma-bond, pi-bond or both, electron system of the aromatic ring by means of field effect and induction so as to create a partial positive charge on the cyano group. In order of decreasing electronegativity, the field effects of various groups relative to hydrogen are: $NR_3^+$, $SR_2^+$, $NH_3^+$, $NO_2$, $SO_2Ar$, COOH, F, Cl, Br, I, OAr, and COOR. All of these just mentioned are considered electron-withdrawing groups. Thus, in practicing the subject invention suitable substituents will be the same or different and may be selected, for example, from halo (fluoride, chloride, bromide, or iodide) and $—NO_2$ $—SO_3H$ —COOH (or —COOR')

$—NR'''_3$ (where R' and R" each is $C_{1-20}$ or aryl).

Further, the substituents can be carbons forming a fused aromatic ring, which can itself be substituted with one or more electron-withdrawing groups as just described.

Without being bound by theory, it is believed that benzonitrile activators give best bleaching performance when they are multiply substituted with electron-withdrawing groups. Additionally, it is believed that the electron-withdrawing groups make the activator more reactive. The peroxide is believed to attack the nitrile moiety nucleophilically to form a peroxyimidic acid intermediate, which is believed to provide the stain removal properties observed. It is believed that the additional withdrawing groups on the aromatic ring enhance the reaction by making the nitrile increasingly electron poor.

A particularly preferred embodiment of the invention is 3,5-dinitrobenzonitrile, which gives an outstanding percent yield of oxidant species in aqueous laundering solutions coupled with bleaching performance on fountain pen ink that can be about comparable to hypochlorite bleaching.

The yield of active oxygen species generated upon reaction of the nitrile moiety and hydrogen peroxide, believed to be peroxyimidic acid, was measured by electrochemical analysis for several inventive embodiments. Increased peroxyimidic yields were obtained for multiply substituted benzonitrile activators as compared to mono-substituted benzonitrile. Four examples of inventive activators gave greater than about 38% yield, with the 3,5-dinitrobenzonitrile inventive activator giving the highest yield at about 83%. Table 3 shows peroxyimidic yields of five activator embodiments.

TABLE 3

| | Percent Yield |
|---|---|
| Inventive Benzonitrile Activator Embodiments | |
| 3,5-Dinitrobenzonitrile | 83.4% |
| Tetrafluoroterephthalonitrile | 64.4% |
| 3,4-Dinitrobenzonitrile | 46.4% |
| 4-Chloro-3-Nitrobenzonitrile | 38.6% |
| TMA-BN | 23.5% |
| Comparative (non-inventive) compound | |
| 4-Nitrobenzonitrile | 20.9% |

Activator embodiments of the invention have showed good stain removal on cotton over a broad range of stains. Multiply substituted benzonitriles of the invention have been tested as giving significantly better bleaching of fountain pen ink as compared with mono-substituted benzonitriles. Indeed, the 3,5-dinitrobenzonitrile embodiment had a bleaching performance that was comparable to 200 ppm hypochlorite. Table 4 illustrates stain removal data for four inventive embodiments.

It is interesting to note that although the TMA-BN embodiment has a percent yield lower than the other embodiments listed in Table 3, it nevertheless has quite good stain removal performance, which is shown by the data of Table 4. It may be that the positively charged quaternary ammonium group has an ionic attraction to fabric surfaces (which, particularly for cotton, tend to be negatively charged).

TABLE 4

| | Stain Removal Performance on Fountain Pen Ink*: | | | |
|---|---|---|---|---|
| Treatments | 100 ppm $H_2O_2$ | 20 ppm $H_2O_2$ | 40 ppm $H_2O_2$ | 60 ppm $H_2O_2$ |
| Prior Art: | | | | |
| 200 ppm NaOCl (No $H_2O_2$) | +23.1 | +40.3 | +37.8 | +32.9 |
| Inventive: | | | | |
| 3,5-Dinitrobenzonitrile | +23.3 | +31.5 | +34.8 | +31.2 |
| 3,4-Dinitrobenzonitrile | +18.6 | +19.7 | — | — |
| 4-Chloro-3-Nitrobenzonitrile | +20.7 | +18.2 | — | — |
| TMA-BN | +16.4 | +14.2 | +20.1 | +23.3 |

*Relative to a "detergent and peroxide" control.

All nitrile activators listed in Table 4 were delivered at 5 ppm theoretical active oxygen (A.O.). Each detergent control contained the corresponding amount of $H_2O_2$. All treatments contained 10 ppm aminopolyphosphonate, 1.23 g/L AATCC Detergent, and 0.81 g/L sodium carbonate (final pH range=10.1–10.5). Conditions: 1 Liter $H_2O$ at 100° F., 12 minute wash, and no hardness added.

Further wash study results, which are illustrated by Table 5, showed superior bleaching of fountain pen ink and an eight stain average (grass, coffee, tea, grape, spaghetti, mustard, gravy, and blueberry) by the 3,5-dinitrobenzonitrile activator embodiment with respect to a non-inventive, mono-substituted benzonitrile.

TABLE 5

| | FP Ink Δ % SRE* | 8-Stain Average Δ %* SRE |
|---|---|---|
| Inventive Activator Embodiment: | | |
| 3,5-Dinitrobenzonitrile | +18.6 | +2.7 |
| TMA-BN | +12.1 | +1.4 |
| Comparative (non-Inventive) Compound: | | |
| 4-Nitrobenzonitrile | +7.7 | +0.1 |

*Δ is by comparison to the control, which was detergent and $H_2O_2$ only.

All nitriles listed above were delivered at 5 ppm theoretical A.O. All treatments contained 20 ppm $H_2O_2$, 10 ppm aminopolyphosphonate, 66.1 g/69 L No-P Tide Detergent (Lot #OH2141ZM), and 56.0 g/69 L sodium carbonate.. Conditions: 69 L $H_2O$ at 100° F., 12 minute wash, and standard hardness and bicarbonate added to simulate average U.S. wash water compositions.

The inventive activators are formulated with a source of peroxygen, such as a solid alkaline peroxide. Suitable sources of peroxide include sodium perborate monohydrate, sodium perborate tetrahydrate, sodium carbonate peroxyhydrate, sodium pyrophosphate peroxyhydrate, urea peroxyhydrate, sodium peroxide, and mixtures thereof. Sodium perborate monohydrate and sodium perborate tetrahydrate are particularly preferred alkaline peroxides for combination with the activators as a dry bleach composition or, when surfactant is included, as a dry laundering and bleaching composition.

Bleaching compositions in accordance with the invention perform best when the activator compound and the peroxygen source are dissolved in an aqueous based solution at a pH of greater than about 8, more preferably a pH between about 10 to about 11. Thus, compositions of the invention can advantageously further comprise one or more of a pH adjusting agent effective to adjust or to maintain the pH of a solution in which the oxidizing agent is dissolved to a pH greater than about 8 (and usually not to exceed about 13, more preferably about 11).

The stability of peroxyimidic acids upon generation in buffer have been found to be quite good with over about 75% of the maximum yield of peroxyimidic acid generated often still present after 12 minutes, which correlates well with a 12 minute wash cycle. Suitable pH adjusting agents, or buffers, are well known to the art and include, for example, carbonates, borates, phosphates, silicates, and bicarbonates.

Another desirable component for the inventive compositions is a metal sequestering agent, which is useful to increase stability of peroxide-containing solutions, such as is noted by U.S. Pat. No. 4,294,575, inventor Kowalski, issued Oct. 13, 1981. Among the useful metal sequestering agents are sodium citrate, STPP, and EDTA. Other useful heavy metal chelating ligands are well known in the art. A particularly preferred metal sequestering agent is a mixture of an alkaline metal phosphonate and an alkaline metal polyphosphonate, available as a series under the trademark "Dequest" from Monsanto, "Briquest" available from Albright & Wilson, and "Bayhibit AM" available from Mobay.

The overall composition of the bleaching products of this invention can vary widely depending upon the amount of optional ingredients such as builders, surfactants, and bulking agents. Therefore the actual composition of the products themselves is not considered to be as important as the ratios between the two essential components. The ranges of essential peroxygen and activator compound in compositions of the invention intended for fabric bleaching are preferably where peroxygen is in a molar ratio with respect to activator compound of about 1:1 or greater. Particularly preferred are ratios of about 2:1 or even more preferably 3:1. Molar ratios of up to about 10:1 have been used successfully.

The amount of inventive activator in the inventive compositions may be such as to yield concentrations of from about 0.1 to about 1,000 ppm in the wash liquid (about $6.25\times10^{-6}$M to about $6.25\times10^{-2}$M). Compositions of the invention with the essential activator and peroxide source can include various wash aids. For example, wash aids may include enzymatic stain removers, which are enzymes capable of hydrolyzing substrates, e.g., stains. Under the International Union of Biochemistry, accepted nomenclature for these types of enzymes is hydrolases. Hydrolases include, but are not limited to, proteases, amylases (carbohydrases), lipases (esterases), cellulases, and mixtures thereof. Proteases, especially so-called alkaline proteases, are commonly employed as wash aids, since they attack protein substrates and digest them, e.g., troublesome stains such as blood and grass.

Commercially available alkaline proteases are derived from various strains of the bacterium *Bacillus subtilis*. These proteases are also known as subtilisins. Nonlimiting examples thereof include the proteases available under the trademarks Esperase®, Savinase®, and Alcalase®, from Novo Nordisk A. S., of Bagsvaerd, Denmark; those sold under the trademarks Maxatase™, and Maxacal® from Gist-Brocades N. V. of Delft, Netherlands; and those sold under the trademark Milezyme® APL, from Miles Laboratories, Elkhart, Ind. Mixtures of enzymes are also included in this invention. See also U.S. Pat. No. 4,511,490, issued to Stanislowski et al, incorporated herein by reference. These commercially available proteases are supplied in prilled, powdered, or comminuted forms. These enzymes can include a stabilizer, such as triethanolamine, clays, or starch.

Other enzymes may also be incorporated. Thus, lipases, which digest fatty substrates, and amylases, which digest starch substrates, can be used in the compositions. These two types of enzymes are available commercially. Lipases are described in U.S. Pat. No. 3,950,277, column 3, lines 15–55, the description of which is incorporated herein by reference. Suitable amylases (and their sources) include Rapidase® (Societe Rapidase, France), Maxamyl® (Gist-Brocades), Termamyl® (Novo Nordisk), and Milezyme® DAL (Miles Laboratories). Cellulases may also be desirable for incorporation and description of exemplary types of cellulases is found from the specifications of U.S. Pat. No. 4,479,881, issued to Tai; U.S. Pat. No. 4,443,355, issued to Murata et al; U.S. Pat. No. 4,435,307, issued to Barbesgaard et al; and U.S. Pat. No. 3,983,002, issued to Ohya et al, all of which are incorporated herein by reference.

Another optional wash aid which can be incorporated into inventive compositions are fluorescent whiteners or optical brighteners. Representative fluorescent whitening agents include the naphtholtriazol stilbene and distyryl biphenyl fluorescent whitening agents sold by the Ciba-Geigy Corporation under the names Tinopal® RBS and Tinopal® CBS-X respectively, and the stilbene materials also marketed by Ciba-Geigy under the name Tinopal® 5BMX. Other useful whiteners are disclosed in columns 3, 4, and 5 of U.S. Pat. No. 3,393,153 and further useful whiteners are disclosed in ASTM publication D-553A, List of Fluorescent Whitening Agents for the Soap and Detergent Industry, which disclosures are incorporated herein by reference.

Yet another class of wash aids which can be incorporated are fragrances, which can be selected from materials well known to the art.

The compositions of this invention may, if desired, also contain additional components such as colorants, primary cleansing agents (surfactants), detergency builders and bulking agents.

Colorants can be selected from materials well known to the art.

Representative surfactants include conventional anionic, cationic, nonionic, ampholytic and zwitterionic surfactant materials as are described in the art. Examples of suitable surfactants for use in these formulations may be found in Kirk-Othmer, Encyclopedia of Chemical Technology, 3rd Edition, volume 22, pages 247–387 (1983) and McCutcheon's Detergents and Emulsifiers, North American Edition (1983). These two disclosures are incorporated herein by reference. One generally preferred group of surfactants are the nonionic surfactants such as are described at pages 360–377 of Kirk-Othmer. Nonionic materials include alcohol ethoxylates, alkyl phenol ethoxylates, carboxylic acid esters, glycerol esters, polyoxyethylene esters, anhydrosorbitol esters, ethoxylated anhydrosorbitol esters, ethoxylates of natural fats, oils and waxes, glycol esters of fatty acids. carboxylic amides, diethanolamine condensates, monoalkanolamine condensates, polyoxyethylene fatty acid amides, polyalkylene oxide block copolymers, poly(oxyethylene-co-oxypropylene) nonionic surfactants and the like. A wide range of such materials are available commercially, including the Shell Chemical Neodols®, the Union Carbide Tergitols®, the ICI Tween® series, and the Span® series and the like.

Detergency builders which may optionally be added to the bleach compositions can be selected from the detergency builders commonly added to detergent formulations. Useful builders include any of the conventional inorganic and organic water-soluble builder salts. Useful inorganic builder salts include, for example, water-soluble salts of phosphates, pyrophosphates, orthophosphates, polyphosphates, silicates, carbonates, and the like. Organic builders include water-soluble phosphonates, polyphosphonates, polyhydroxysulfonates, polyacetates, carboxylates, polycarboxylates, succinates, and the like.

Specific examples of inorganic phosphate builders include sodium and potassium tripolyphosphates, pyrophosphates, and hexametaphosphates. The organic polyphosphonates specifically include, for example, the sodium and potassium salts of ethane-1-hydroxy-1,1-diphosphonic acid and the sodium and potassium salts of ethane-1,1,2-triphosphonic acid. Examples of these and other phosphorous builder compounds are disclosed in U.S. Pat. Nos. 3,213,030; 3,422,021; 3,422,137; and 3,400,176. Pentasodium tripolyphosphate and tetrasodium pyrophosphate are especially preferred water-soluble inorganic builders.

Specific examples of nonphosphorous inorganic builders include water-soluble inorganic carbonate, bicarbonate, and silicate salts. The alkali metal, for example, sodium and potassium, carbonates, bicarbonates, and silicates are particularly useful herein.

Water-soluble organic builders are also useful. For example, the alkali metal, ammonium and substituted ammonium polyacetates, carboxylates, polycarboxylates, and polyhydroxysulfonates are useful builders for the compositions and processes of the invention. Specific examples of polyacetate and polycarboxylate builders include sodium, potassium, lithium, ammonium, and substituted ammonium salts of ethylene diaminetetraacetic acid, nitrilotriacetic acid, benzene polycarboxylic (i.e., penta- and tetra-) acids, carboxymethoxysuccinic acid and citric acid.

Water-insoluble builders may also be used, particularly the complex sodium alumino silicates such as zeolites, e.g., zeolite 4 A, a type of zeolite molecular sieve wherein the univalent cation is sodium and the pore size is about 4 Å. The preparation of such type zeolite is described in U.S. Pat. No. 3,114,603. The zeolite may be amorphous or crystalline and have waters of hydration as is known in the art.

Fillers or bulking agents may also be included in the bleaching compositions of the invention. A preferred filler salt is an alkali metal sulfate or an alkali chloride, such as potassium or sodium sulfate, the latter being especially preferred.

An inventive composition could be formulated as follows:

| | |
|---|---|
| Peroxygen material | 0.5–30% wt. |
| Activator | 0.5–30% wt. |
| Optional preferred metal seq. agent | 0–5% wt. |
| Buffer | 0–75% wt. |
| Various other optional materials | reminder |

The bleaching compositions of the invention may be prepared by admixing the ingredients. When preparing solid combination products with surfactants and/or builder salts, the peroxygen compound and activator can be mixed either directly with the wash aids, surfactant, builder, and the like, or peroxygen compound and activator can be separately or collectively coated with a coating material to prevent premature activation of the bleaching agent. The coating process is conducted in accordance with procedures well known in the art. Suitable coating materials include compounds such as magnesium sulfate, polyvinyl alcohol, lauric acid or its salts, and the like.

The materials of this invention find particular application, without limitation, in commercial and domestic laundry settings, and can be added to the prewash segment, the wash segment or a rinse segment of the overall cycle. Most commonly, it is preferred to add the materials to the wash segment of the cycle.

The conditions of use can include cold water and hot water wash conditions with water temperatures ranging from a low of about 33° F. to a high of about 212° F.

It is to be understood that while the invention has been described above in conjunction with preferred specific embodiments, the description and examples are intended to illustrate and not limit the scope of the invention, which is defined by the scope of the appended claims.

It is claimed:

1. A composition useful for bleaching, comprising:

(a) an aromatic bleach precursor the aromatic ring of which is substituted by at least one cyano group and additionally with at least one electron-withdrawing group other than cyano, wherein the electron-withdrawing group is selected from group (i) or group (ii), wherein group (i) is

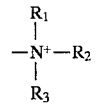

where $R_1$, $R_2$ and $R_3$ are $C_{1-20}$ alkyl, $C_{1-20}$ alkyl aryl, or at least two of $R_1$, $R_2$, or $R_3$ joined to form a heterocycle; and where group (ii) is halo, nitro, sulfonic acid, sulfonyl chloride, sulfonate ester, carboxylate ester, and aryl substituted with one or more of halo, nitro, sulfonic acid, sulfonyl chloride, sulfonate ester, carboxylate ester; wherein when there is only one cyano group substituted on the aromatic ring of the precursor and when the electron-withdrawing group is selected from group (ii), then there are at least two of such electron-withdrawing groups selected from group (ii); and, (b) a peroxygen source, wherein the precursor reacts with peroxygen to provide peroxyimidic acid.

2. The composition of claim 1 wherein the substituted benzonitrile is selected from (a) (i).

3. The composition of claim 1 wherein the peroxygen source is in a sufficient amount to provide peroxygen and to form an oxidizing agent derived from the reaction of the substituted benzonitrile and the peroxygen.

4. The composition of claim 3 further comprising a pH adjusting agent, a metal-sequestering agent or both.

5. The composition of claim 4 wherein the pH adjusting agent is effective to adjust or to maintain the pH of a solution in which the oxidizing agent is dissolved to a pH greater than about 8.

6. The composition of claim 4 wherein the pH adjusting agent is effective to adjust or to maintain the pH of a solution in which the oxidizing agent is dissolved to a pH between about 10 to about 11.

7. The composition of claim 4 wherein the metal sequestering agent includes a phosphonate, a polyphosphate, or mixtures thereof.

8. The composition of claim 4 wherein the peroxygen source provides peroxygen in a molar ratio with respect to the substituted benzonitrile of greater than about 1:1.

9. The composition of claim 1 wherein the precursor is a substituted benzonitrile having the structure:

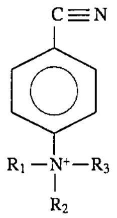

where $R_1$, $R_2$ and $R_3$ are $C_{1-20}$ alkyl.

10. The composition of claim 9 wherein $R_1$, $R_2$ and $R_3$ of the substituted benzonitrile are either methyl or ethyl.

11. A composition comprising:

a peroxyimidic acid precursor, the precursor being selected from the group consisting: 4-trimethylamino-benzonitrile, 3,5 dinitrobenzo-nitrile, tetrafluoro-terephthalonitrile, 3,4 dinitrobenzo-nitrile, and 4-chloro-3-nitro-benzonitrile a peroxygen source in a sufficient mount to form about a stoichiometric amount of peroxyimidic acid as a reaction product of the precursor; and an optional pH adjusting agent, a metal sequestering agent, or both a pH adjusting agent and a metal sequestering agent.

12. The composition of claim 11 wherein the peroxygen source provides peroxygen in a molar ratio with respect to the precursor of greater than about 1:1.

13. The composition of claim 11 wherein the pH adjusting agent is effective to adjust or to maintain the pH of a solution in which the peroxygen source and the precursor are dissolved to a pH greater than about 8.

14. The composition of claim 11 wherein the optional metal sequestering agent includes a phosphonate, a polyphosphate, or mixtures thereof.

15. The composition of claim 11 wherein the precursor is 4-trimethylamino-benzonitrile.

16. The composition of claim 11 wherein the precursor is 3,5 dinitrobenzo-nitrile.

17. The composition of claim 11 wherein the precursor is tetrafluoroterephthalonitrile.

18. The composition of claim 11 wherein the precursor is 3,4 dinitrobenzo-nitrile.

19. The composition of claim 11 wherein the precursor is 4-chloro-3-nitrobenzonitrile.

* * * * *

UNITED STATES PATENT AND TRADEMARK OFFICE

CERTIFICATE OF CORRECTION

PATENT NO. : 5,591,378

DATED : January 7, 1997

INVENTOR(S) : Deline et al.

It is certified that error appears in the above-indentified patent and that said Letters Patent is hereby corrected as shown below:

In Column 11, line 18 & 19 in claim 11:
replace "selected from the group consisting: 4-trimethylamino-benzonitrile," with:

--selected from the group consisting of: 4-trimethylamino-benzonitrile,--

In Column 11, line 22, in Claim 11:
replace "a peroxygen source in a sufficient mount to form about a" with:

--a peroxygen source in a sufficient amount to form about a --

Signed and Sealed this

Thirteenth Day of January, 1998

Attest:

BRUCE LEHMAN

Attesting Officer

Commissioner of Patents and Trademarks